United States Patent [19]

Bournicon et al.

[11] 4,188,813
[45] Feb. 19, 1980

[54] METHOD AND MACHINE FOR THE MANUFACTURE OF LONG CONCRETE DRILLS PROVIDED WITH HELICAL SPLINES OVER PART OF THEIR LENGTH

[75] Inventors: Claude Bournicon, Lerpt; James Mansion, St. Etienne, both of France

[73] Assignee: Centre Technique des Industries Mecaniques, Senlis, France

[21] Appl. No.: 898,287

[22] Filed: Apr. 20, 1978

[30] Foreign Application Priority Data

Apr. 26, 1977 [FR] France ................................ 77 12500

[51] Int. Cl.² .............................................. B21K 5/04
[52] U.S. Cl. ...................................... 72/299; 72/371; 76/108 T
[58] Field of Search ......................... 72/299, 371, 342; 219/153; 76/108 R, 108 T

[56] References Cited

U.S. PATENT DOCUMENTS

| 2,715,431 | 8/1955 | Grossu .................................. 72/299 |
| 3,117,471 | 1/1964 | O'Connell et al. ................. 76/108 T |

FOREIGN PATENT DOCUMENTS 229049  2/1925  United Kingdom ...................... 72/371

*Primary Examiner*—Lowell A. Larson
*Attorney, Agent, or Firm*—Cantor and Singer

[57] ABSTRACT

A part such as a long concrete drill provided initially with rectilinear splines is heated in successive zones while producing a controlled increase in the distance between the two extremities. The part to be formed is thus subjected to controlled plastic elongation while the two extremities are driven in rotation at different speeds in order to subject the splined portion to a twisting effort and thus to convert the rectilinear splines to helical splines.

8 Claims, 4 Drawing Figures

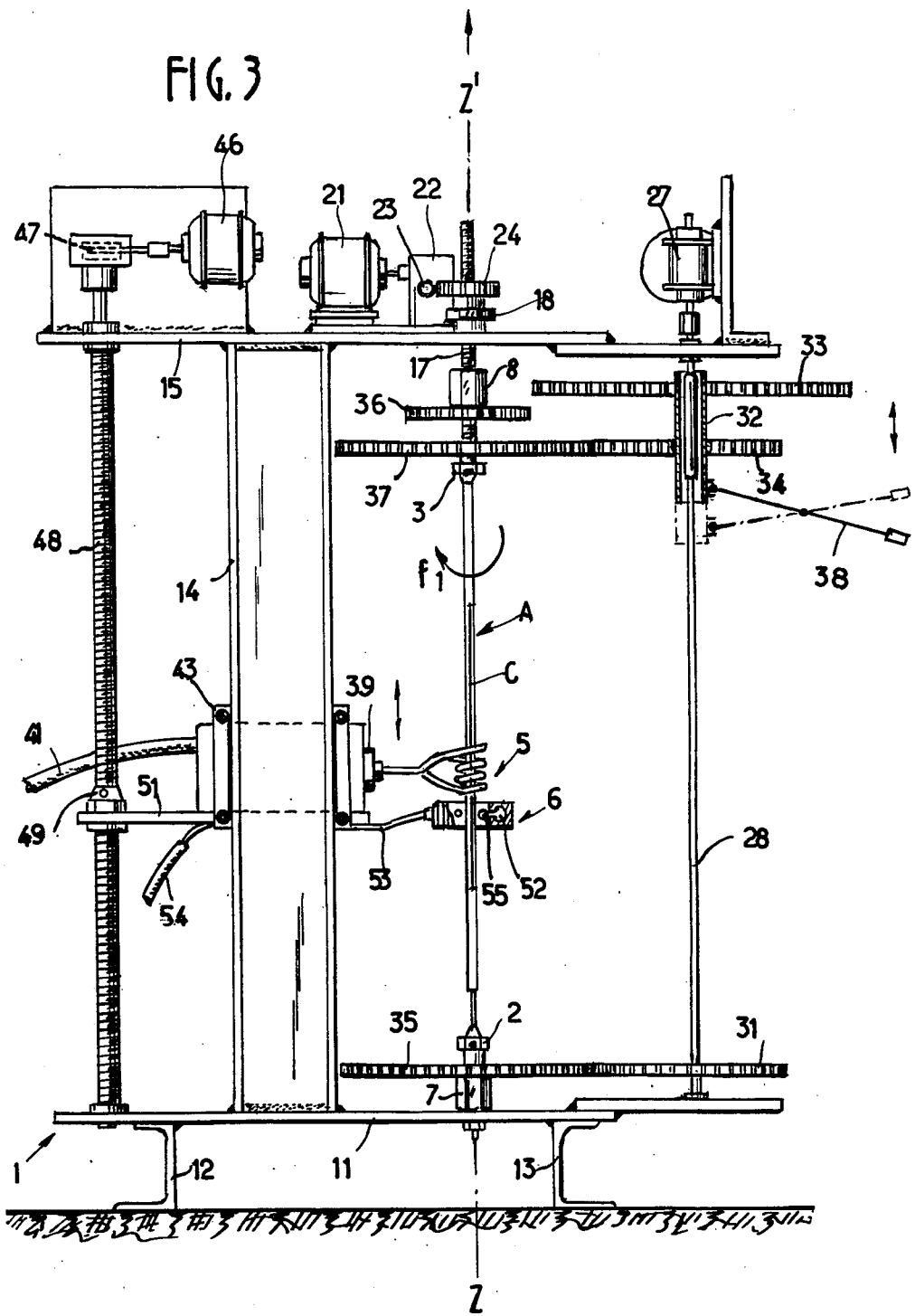

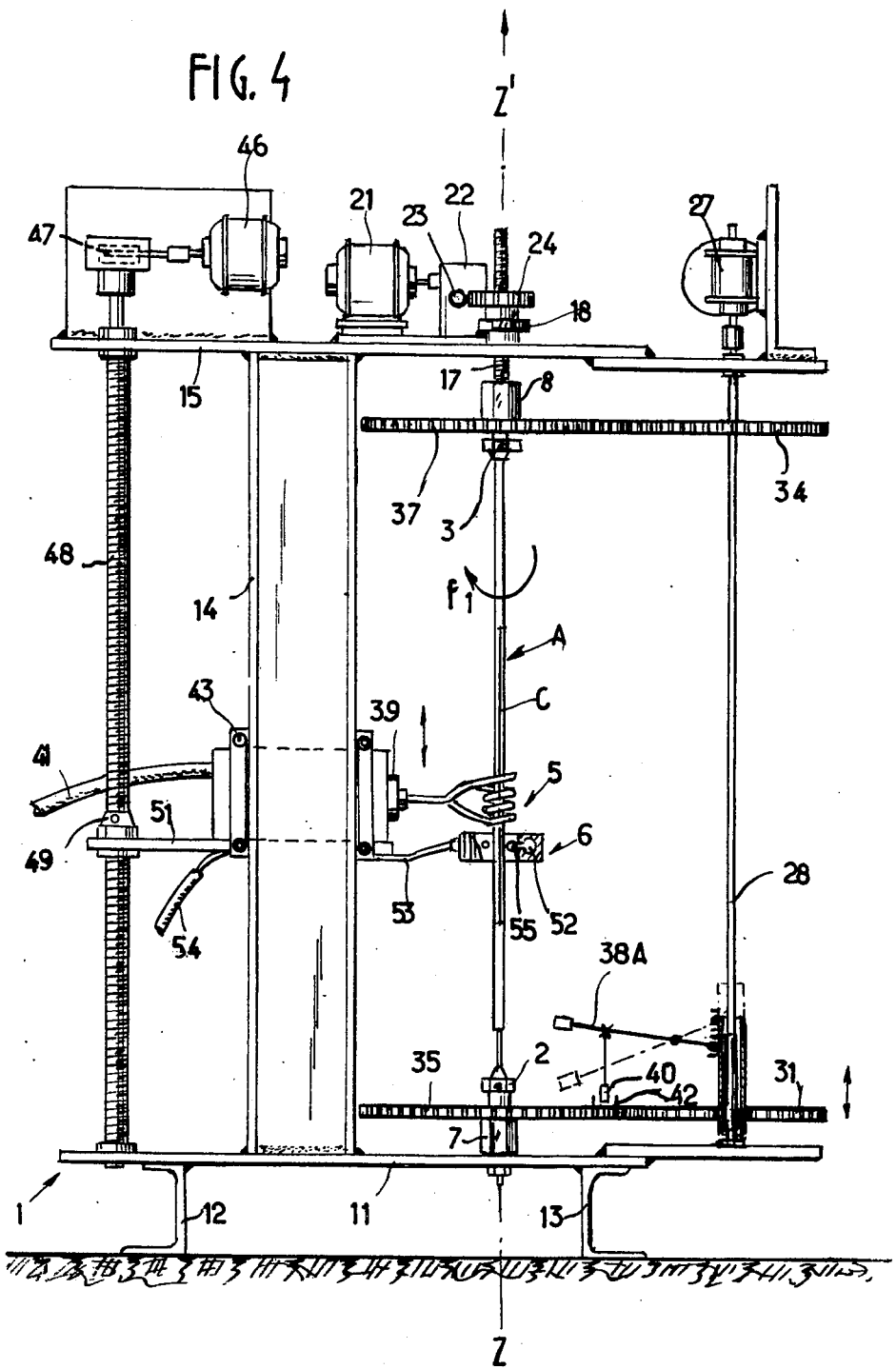

METHOD AND MACHINE FOR THE MANUFACTURE OF LONG CONCRETE DRILLS PROVIDED WITH HELICAL SPLINES OVER PART OF THEIR LENGTH

This invention relates to the manufacture of long concrete drills having helical splines extending over part of the length of the drill or to similar parts of slender shape.

The conventional range of production of long concrete drills comprises the following operations: machining of helical splines, adjustment of the drill to the requisite length, pointing, milling of the drill bit recess, heat treatments which involve hardening and tempering, truing, and brazing of the drill bit.

However, the methods usually employed for the hardening operation give rise in the majority of cases to substantial deformation of the parts.

The aim of the invention is to provide another method of manufacture which is not subject to the above-mentioned disadvantages of conventional methods.

To this end, the principle applied to the fabrication of articles of this type in accordance with the present invention consists in successively heating at least certain portions of the part and subjecting this latter to elongation of controlled value by means of a controlled increase in the distance between the two extremities of the part in order to subject this latter to plastic elongation while driving it in rotation at both ends about its own longitudinal axis.

In accordance with the invention, a long concrete drill provided with helical splines over part of its length or a similar part is fabricated from a starting element having rectilinear splines. During the treatment of the splined portion of the part, the two ends of said part are driven in rotation at different speeds in order to subject said splined portion to a twisting effort and thus to convert the rectilinear splines aforesaid to helical splines.

By means of this method, it is possible to obtain from a preformed starting element in a single operation a partially twisted and completely hardened part which has an integral fiber and perfect straightness.

Further distinctive features of the method will be indicated hereinafter.

In order to produce parts of the type under consideration, the invention is also concerned with the use of a machine of known type comprising a frame, two devices for clamping the two extremities of a slender part to be treated which are mounted in the frame in line and in such a manner as to permit of displacement towards or away from each other, means for carrying out controlled progressive withdrawal of the two clamping devices, an element for heating the part which is movable on a column mounted parallel and in proximity to the line on which the two clamping devices are located, and means for displacing the heating element along the column, the two devices for clamping the two extremities of a part to be treated being mounted in such a manner as to be capable of rotating about their own axes and about the line aforesaid, and the machine being provided with means for driving said clamping devices in substantially synchronous rotational motion, as well as means for cooling that portion of the part which has just been heated, said cooling means being rigidly fixed to said heating element.

In accordance with the invention, the machine for the production of a slender part such as a long concrete drill provided with helical splines over part of its length and fabricated from a starting element having rectilinear splines further comprises means for temporarily driving the ends of said part at different speeds during the treatment of the splined portion of the part.

A more complete understanding of the invention will be gained from the following description and from the accompanying drawings which show by way of example one embodiment of a machine in accordance with the invention for the fabrication of long concrete drills, and in which:

FIG. 3 is a view in elevation showing a first embodiment of the machine;

FIG. 4 is a view in elevation showing a second embodiment.

Figure 1:
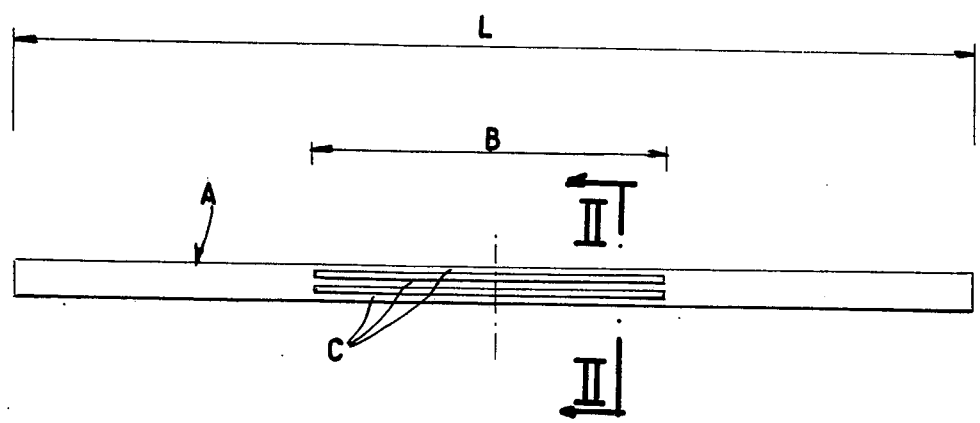
FIG. 1 is a view in elevation showing a starting element for the simultaneous production of two drills.
Figure 2:
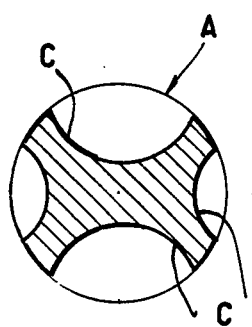
FIG. 2 is a transverse sectional view to a larger scale, this view being taken along line II—II of FIG. 1.

In accordance with the invention, the long concrete drills are fabricated in pairs from a starting element "A" (as shown in FIGS. 1 and 2). The starting element is constituted by a cylindrical rod having a length "L" equal to double the length of the drills to be obtained. The length of the central zone "B" of said starting element is substantially equal to twice the length of the splined portion of a drill. Said central zone is provided with parallel rectilinear splines "C" formed by any conventional means such as swaging, rolling, machining by removal of material and so forth.

A machine for the manufacture of drills of this type is shown in FIG. 3 and essentially comprises a frame generally designated by the reference 1, two clamping devices constituted in this example by two chucks 2, 3 for clamping the two respective extremities of a starting element "A", a heating element 5, and a cooling element 6.

The frame 1 comprises a bottom platform 11 which rests on two longitudinal members 12, 13 and supports a column 14, a top platform 15 being fixed on the top end of said column.

The two chucks 2 and 3 are mounted coaxially on a vertical line Z—Z', the bottom chuck 2 being rotatably mounted within a sleeve 7 which is fixed on the bottom platform 11 and the top chuck 3 being rotatably mounted within another sleeve 8 located in the vicinity of the top platform 15. The upper sleeve 8 is carried by a vertical screw 17 which is keyed for sliding motion in the platform 15 coaxially with the line Z—Z'. Said upper sleeve is engaged in a nut 18 which bears on the top face of the top platform 15 and which can be driven in rotation from an electric motor 21 through a transmission system comprising a reduction-gear unit 22 and worm 23 disposed in meshing engagement with a tangent gear-wheel 24 which is rigidly fixed to the nut 18.

The chucks 2, 3 for clamping the extremities of the starting element permit of rapid clamping and release of the type encountered in the drill-holding chucks of drilling machines. It must be made possible to rotate the chucks in synchronism at the time of treatment of the non-splined zones of the starting element and at different speeds (one speed can be zero) at the time of treatment of the splined zone.

In the embodiment under consideration and shown in FIG. 3, the chucks 2, 3 are driven in rotation from an electric reduction-gear motor 27 through a transmission system comprising a vertical shaft 28 rotatably mounted in the two platforms 11 and 15. A gear-wheel 31 is fixed on the lower end of the shaft 28 whilst a sleeve 32 which carries two gear-wheels 33, 34 is keyed for sliding motion on the upper end of said shaft. The gear-wheels 31 and 34 have the same diameter but the gear-wheel 33 is larger.

A gear-wheel 35 which is continuously in mesh with the gear-wheel 31 is fixed on the bottom chuck 2 whilst two gear-wheels 36, 37 are fixed on the top chuck 3. The gear-wheel 33 or the gear-wheel 34 can be disposed selectively in meshing engagement with said gear-wheels 36, 37 under the action of an operating lever 38 which serves to control the sliding motion of the sleeve 32 on the shaft 28. The gear-wheels 35 and 37 have the same diameter whilst the gear-wheel 36 has a smaller diameter.

The heating element 5 is of the induction type and is constituted by an electric conductor forming a plurality of turns which are wound about the line Z—Z' and the ends of which are fixed in an insulating support 39 and connected to a twin-lead supply cable 41. The support 39 is secured to a carriage 43 which is capable of traveling along the column 14 under the action of an electric motor 46 having two directions of rotation by means of a transmission system comprising a speed-reduction unit 47 and a vertical screw 48 which is pivotally mounted in the two platforms 11 and 15, a nut 49 being engaged on said screw and fixed on a support bracket 51 which is rigidly fixed to the carriage 43.

The cooling element 6 is constituted by a hollow annular component which is also secured to the carriage 43 by means of a tube 53 which serves to supply a cooling fluid such as water to the component 52 from a flexible hose 54 connected to a suitable fluid source. The annular component 52 is located beneath the induction heating element 5 and is also centered on the vertical line Z—Z'. There are formed in the bottom face of said heating element radial holes 55 through which the cooling fluid is sprayed under pressure against the part A.

The operation of the machine takes place as follows:

In order to treat a starting element A, said element is introduced into the induction heating coil 5 and into the cooling element 52 which are placed in the lower portion of the machine together with the carriage 43. The lower end of the starting element is fixed in the chuck 2 and the upper end of said element is fixed in the chuck 3. The heating element 5 is supplied with electric current and the cooling element 6 is supplied with cold water. The operating lever 38 is placed in the bottom position shown in full lines in FIG. 3, in which the gear-wheel 34 is in mesh with the gear-wheel 37. The electric motor 27 is then started-up and drives the part in rotation about its own axis as indicated by the arrow f1. The motor 21 is also started-up and initiates rotation of the nut 18 in a direction such that, taking into account the direction of slope of the thread of the screw 17, the sleeve 8 in which the upper chuck 3 is rotatably mounted undergoes upward displacement at a very low speed in order to subject the heated portion of the part A to local elongation. The temperature and value of said elongation are predetermined so as to ensure that said elongation has a plastic character in the heated zone or, in other words, produces a deformation which exceeds the limit of elastic deformations of the heated portion to a slight extent in order to produce a slight permanent deformation towards perfect straightness of the part. The value of the resultant stress on the part is adjusted at each instant to the plastic resistance of the heated portion.

As soon as the temperature required for this treatment has been attained in the first heated lower portion of the part, the electric motor 46 is started-up, thus initiating the upward displacement of the carriage 43, consequently of the induction heating element 5 and of the cooling element 6 carried by this latter. The previously heated portion of the part is therefore rapidly cooled by the element 6 from which water is sprayed in jets onto the part through the holes 55 whilst that portion of the part which is located immediately above is in turn heated and undergoes the requisite heat treatment and plastic elongation. All the motors rotate in a uniform manner, the two extremities of the part A rotate about their own axes at the same speed and the heating element 5 and cooling element 6 move upwards slowly whilst elongation of the part continues in a uniform manner and is localized within the freshly heated portion of said part.

When the induction heating coil 5 reaches the splined central portion "C" of the starting element "A", a relative movement of rotation is then carried out between the two chucks 2 and 3. To this end, the operating lever 38 is brought to the top position shown in chain-dotted lines in which the gear-wheel 33 of larger diameter than the gear-wheel 31 is disposed in meshing engagement with the gear-wheel 36, with the result that the upper chuck 3 rotates at a higher speed than the lower chuck 2.

The starting element is thus twisted at a constant rate and hardened at the same time in the zone provided initially with rectilinear splines which have now become permanent helical splines.

As soon as the hot zone of the part passes away from the splined portion, the two chucks 2, 3 are again driven at the same speed of rotation by restoring the operating lever 38 to the initial position shown in full lines.

The treatment is completed when the cooling element 6 has reached the upper end of the part. The supply of the induction heating element 5 and of the cooling element 6 is cut-off and the carriage 43 which carries said elements is returned downwards to its starting point at high speed. The part is removed from the chucks 2, 3 and then cut at the center in order to obtain two drills. Only the twisted zone can be hardened with the result that there is no loss of material in this case.

The elongating device of the machine compensates for the increase in length by expansion which results from heating and maintains a resultant stress in the cooled zone after heating, thus preventing the appearance of permanent deformations which usually arise from heat treatment.

The rate of elongation must be adjusted in accordance with the longitudinal displacement of the heating and cooling elements. By reason of the reduction in cross-sectional area in the splined zone, it may prove useful to modify the rate of displacement of the heating elements and the rate of elongation of the starting element.

In the alternative embodiment of machine shown in FIG. 4, the manufacturing process is substantially the same. The only difference lies in the way of establishing a difference between the speeds of rotation of the two ends of the starting element in order to form helical splines. To this end, the gear-wheel 34 is rigidly fixed on the top portion of the shaft 28 and is continuously in mesh with the gear-wheel 37 which is then the only wheel fixed on the top chuck 3 whilst the gear-wheel 31 is keyed for sliding motion on the lower portion of the shaft 28 under the action of an operating lever 38A which can be moved either to the top position shown in full lines in which the gear-wheel 31 is in mesh with the gear-wheel 35 or to the bottom position shown in chain-dotted lines in which the gear-wheel 31 is disengaged from the wheel 35. Moreover, in the bottom position, the operating lever 38A engages a locking member 40 within an opening 42 of the gear-wheel 35 in order to prevent rotation of this latter.

Thus, when the operating lever 38A is in its top position, the two ends of the part A rotate at the same speed; when said lever is in the bottom position, however, the lower end of the part A is maintained stationary whilst the upper end thereof continues to be driven at the same speed, thus resulting in torsion of the splined portion of said part.

Many alternative embodiments of the machine which is illustrated can be contemplated. From this it follows by way of example:

that instead of being constituted by a screw and nut system, the elongating device could be constituted in any other suitable manner and be provided either separately or in combination with mechanical, electrical, hydraulic or pneumatic devices;

that the control of variation in relative speed of rotation of the two ends of the part could be carried out in a way other than by operating a manual control device, for example by means of an automatic control (of the mechanical electromechanical, electronic or hydraulic type, for example);

that localized heating can be performed by any suitable means of known type such as by high-frequency or medium-frequency induction heating, by Joule effect, by means of a torch, a hot-air gun and so forth;

that cooling can be effected by blowing gas or by spraying either oil or alternatively an aqueous mixture;

that the displacement of the heating and cooling device can be controlled by any suitable means of the mechanical, electrical, hydraulic or pneumatic type; the displacement as well as the heating power can be controlled if necessary in dependence on the elongating device.

It is readily apparent that the invention is not limited to the modes of operation and the modes of construction which have been described with reference to the accompanying drawings and have been given solely by way of example. Depending on the applications which are contemplated, modifications can accordingly be made without thereby departing either from the scope or the spirit of the invention.

We claim:

1. A method for manufacture of a long concrete drill having helical splines extending over part of the length of the drill or any similar part of slender shape which comprises providing a workpiece having rectilinear splines, successively heating at least certain portions of the workpiece and subjecting said workpiece to elongation of controlled value by means of a controlled increase in the distance between the two extremities of the workpiece in order to subject said workpiece to plastic elongation while driving it in rotation at both ends about its own longitudinal axis, subjecting the two ends of the workpiece to different speeds of rotation during treatment of the splined portion of said workpiece in order to subject said splined portion to a twisting effort and thus to convert said rectilinear splines to helical splines, and subjecting the two ends of the workpiece to the same rotational speed during treatment of the non-splined portion of said workpiece.

2. A method according to claim 1, wherein a zero value is given temporarily to the speed of rotation of one end of the workpiece.

3. A method according to claim 1, wherein that portion of the workpiece which has just been heated is cooled when the application of heat is transferred to the following portion and the effort resulting from plastic resistance of the heated portion serves to maintain straightness of said portion during the cooling process, wherein the starting element is a single workpiece formed by two components juxtaposed in the splined portions thereof and wherein said workpiece is cut at the center after treatment in order to obtain two identical parts.

4. A machine for the manufacture of a long concrete drill provided with helical splines over part of its length or of any like slender part to be fabricated from a starting element provided with rectilinear splines, comprising a frame, two devices for clamping the two extremities of a slender part to be treated which are mounted in the frame in line and in such a manner as to permit of displacement towards or away from each other, means for carrying out controlled progressive withdrawal of the two clamping devices, an element for heating the part which is movable on a column mounted parallel and in proximity to the line on which the two clamping devices are located, and means for displacing the heating element along the column, the two devices for clamping the two extremities of a part to be treated being mounted in such a manner as to be capable of rotating about their own axes and about the line aforesaid, and the machine being provided with means for driving said clamping devices in substantially synchronous rotational motion, as well as means for cooling that portion of the part which has just been heated, said cooling means being rigidly fixed to said heating element, wherein said machine further comprises means for temporarily driving the ends of the part in rotation at different speeds during treatment of the splined portion of said part.

5. A machine according to claim 4, wherein the two devices for clamping the part are driven in rotation by means which are independent of each other and at least one of which is capable of operating at variable speed.

6. A machine according to claim 4, wherein the two devices for clamping the part are driven in rotation by means of a single driving member, one of said clamping devices being driven by means of a releasable coupling whilst means are capable of securing said device against rotation when said coupling is released.

7. A machine according to claim 5, wherein the means for driving the two part-clamping devices in rotation comprise a driving shaft continuously coupled on the one hand with one of said clamping devices by means of a train of gear-wheels which are continuously in mesh and, on the other hand, with the other part-clamping device aforesaid selectively by means of either of two trains of gear-wheels which have different ratios but one of which is equal to the ratio of the train of gear-wheels aforementioned.

8. A machine according to claim 6, wherein the driving member is a rotary shaft continuously coupled on the one hand with one of said part-clamping devices by means of a train of gear-wheels which are continuously in mesh and, on the other hand, with the other part-clamping device aforesaid by means of a train of releasable gear-wheels having the same ratio as the train aforementioned.

* * * * *